United States Patent
Xiao et al.

(10) Patent No.: US 12,325,771 B1
(45) Date of Patent: Jun. 10, 2025

(54) PREPARATION METHOD FOR BIOBASED POLYURETHANE ELASTIC FIBERS

(71) Applicant: JINJIANG ANRUN TEXTILE CO., LTD., Quanzhou (CN)

(72) Inventors: Jinbin Xiao, Quanzhou (CN); Honghui Yin, Quanzhou (CN)

(73) Assignee: JINJIANG ANRUN TEXTILE CO., LTD., Quanzhou (CN)

( * ) Notice: Subject to any disclaimer, the term of this patent is extended or adjusted under 35 U.S.C. 154(b) by 0 days.

(21) Appl. No.: 19/094,550

(22) Filed: Mar. 28, 2025

Related U.S. Application Data

(63) Continuation of application No. PCT/CN2024/135144, filed on Nov. 28, 2024.

(30) Foreign Application Priority Data

May 20, 2024 (CN) .......................... 202410620543.7

(51) Int. Cl.
- *C08G 18/10* (2006.01)
- *C08G 18/48* (2006.01)
- *C08G 65/30* (2006.01)
- *D01F 6/70* (2006.01)

(52) U.S. Cl.
CPC ............. *C08G 18/10* (2013.01); *C08G 18/48* (2013.01); *C08G 65/30* (2013.01); *D01F 6/70* (2013.01); *D10B 2331/10* (2013.01); *D10B 2401/046* (2013.01)

(58) Field of Classification Search
CPC ......... C08G 18/10; C08G 18/48; C08G 65/30
See application file for complete search history.

(56) References Cited

U.S. PATENT DOCUMENTS

| | | | | |
|---|---|---|---|---|
| 2006/0210794 A1* | 9/2006 | Hutte | ......................... | D01F 6/70 524/495 |
| 2016/0002827 A1* | 1/2016 | Tanaka | ...................... | D01F 6/70 528/76 |
| 2022/0033997 A1* | 2/2022 | Chen | ................... | C08G 18/2865 |

FOREIGN PATENT DOCUMENTS

| | | |
|---|---|---|
| CN | 101392054 B | 3/2009 |
| CN | 105315450 B | 2/2016 |
| CN | 108251912 B | 7/2018 |
| CN | 111575817 A | 8/2020 |
| CN | 112358608 A | 2/2021 |
| CN | 113774522 B | 12/2021 |
| CN | 114230782 B | 3/2022 |
| CN | 112410930 B | 1/2023 |
| CN | 117127276 A | 11/2023 |
| CN | 118186624 A | 6/2024 |
| GB | 1159212 A | 7/1969 |
| WO | 2009043301 A1 | 9/2009 |

OTHER PUBLICATIONS

Cao yunlai, "Sealant Technology, formula, and application", «Chemical Industry Press» , Aug. 2001 (Aug. 2001), p. 194-195.

* cited by examiner

Primary Examiner — Michael L Leonard
(74) Attorney, Agent, or Firm — JEEN IP LAW, LLC

(57) ABSTRACT

A preparation method for biobased polyurethane elastic fibers is provided. Polyether polyols are prepared using sucrose, glycerol, dimethylamine, and epoxypropane; adding solvent N, N-dimethylacetamide, polyether polyol, and polyisocyanate to a reaction tank, and obtaining spinning solution by adding p-toluenesulfonyl semicarbazide and aluminum methylene (2,4-di-tert-butylphenoxy) phosphate; by using dry spinning technology, the spinning solution is spun and oiled to produce the biobased polyurethane elastic fibers. The present disclosure ensures that the performance of polyurethane elastic fibers is not reduced or partially improved, and cost and performance advantages are also balanced.

5 Claims, No Drawings

PREPARATION METHOD FOR BIOBASED POLYURETHANE ELASTIC FIBERS

CROSS-REFERENCE TO RELATED APPLICATIONS

This application is a continuation of International Application No. PCT/CN2024/135144, filed on Nov. 28, 2024, which claims priority to Chinese Patent Application No. 202410620543.7, filed on May 20, 2024, which is hereby incorporated by reference in its entirety.

TECHNICAL FIELD

The present disclosure relates to the field of polyurethane elastic fiber technologies, and in particular, to a preparation method for biobased polyurethane elastic fibers.

BACKGROUND

Polyurethane elastic fiber is a block copolymer mainly composed of polyurethane, commonly known as spandex in China, and is one of the most widely used elastic fibers. Polyurethane elastic fibers are widely used in the clothing and textile industry due to their extraordinary stretching and recovery abilities, as well as their high elasticity, low modulus, and high resistance to hydrolysis. At present, various preparation methods for polyurethane elastic fibers have been disclosed in the market. For example, in CN112410930B, a polyurethane elastic fiber with excellent dyeing performance and a preparation method thereof are disclosed. The polyurethane elastic fiber includes polyurethane and/or polyurethane urea and modified nylon resin, the modified nylon resin accounts for 0.1-30% of a mass percentage of the polyurethane elastic fiber composite material. The polyurethane and/or polyurethane urea are obtained by reacting oligomeric dihydric alcohol, diisocyanate, and chain extenders.

A high elongation and high strength polyurethane elastic fiber and a preparation method thereof are disclosed in CN113774522B. Polyether glycol, polyether ester diol, and diisocyanate are reacted to obtain polyurethane prepolymer, which is then dissolved in a polar solvent. Chain extenders and chain terminators are added to prepare polyurethane urea solution A. Polyurethane urea solution B is prepared by reacting polyester glycol, polyether ester diols, and diisocyanate to obtain polyurethane prepolymers, which are then dissolved in polar solvents. Chain extenders and chain terminators are added to prepare the polyurethane urea solution B. Using polyurethane urea solution A as a skin layer material and polyurethane urea solution B as a core layer material, fibers with a skin core structure are prepared through a spinneret assembly. The fibers with the skin core structure can evaporate polar solvents through high-temperature channels and then be coated with oil to produce high elongation and high strength polyurethane elastic fibers. By introducing aromatic polyester diols, the strength is improved, and by introducing high molecular weight polyether ester diols, the elongation at break is increased.

A biobased spandex elastic fibre and its preparation method are disclosed in CN117127276A. Biobased spandex is introduced into spandex molecular chains through biobased polyether polyols, the biobased polyether polyols contain biobased 1,3-propanediol unit structures. The bio-based spandex reacts with a mixture of bio-based polyurethane prepolymer and mixed amine to obtain a raw material containing polyurethane urea polymer. The bio-based spandex elastic fiber is obtained by dry spinning.

Although there have been many studies on the performance improvement of polyurethane elastic fibers, there are relatively few reports on the preparation of biobased polyurethane elastic fibers using green and renewable raw materials. Biodegradable materials with environmentally friendly properties have received great attention. As a traditional industry, spandex must also accelerate green new technologies and industrial transformation and upgrading. Green and low-carbon bio-based spandex will undoubtedly be the trend of spandex development in the future. Polyols and isocyanates are two major raw materials for synthesizing polyurethane, currently mainly sourced from petroleum resources. With the depletion of oil resources and the intensification of environmental problems, the preparation of polyurethane from green and renewable biomass resources has become one of the important directions for the development of China's strategic emerging materials and biomass industries. Compared to petroleum based polyurethane raw materials, bio-based polyurethane raw materials have lower toxicity, more abundant sources, lower prices, and more diverse structures, which are conducive to the expansion of industrial production scale and the reduction of production costs and effectively improves the comprehensive performance of polyurethane materials. However, the use of biomass raw materials to prepare elastic fibers may result in insufficient or unstable reactions due to differences in performance between biobased raw materials and petrochemical based materials, or the performance of the resulting elastic fibers may decrease and be difficult to meet usage requirements, or there may be issues with high costs.

Based on the above issues, a preparation method for biobased polyurethane elastic fibers is provided.

SUMMARY

The purpose of the present disclosure is to provide a preparation method for biobased polyurethane elastic fibers that can ensure the performance is not reduced or partially improved and balance the cost and performance advantages.

In order to achieve the above objectives, the present disclosure adopts the following technical solution.

A preparation method for biobased polyurethane elastic fibers, including the following steps:

step A: adding sucrose and glycerol in a molar ratio of 1-2:1 into a reaction vessel, and adding dimethylamine with an amount of 30-50% of a total amount of dimethylamine (in this application, dimethylamine was added twice, and the total amount of dimethylamine here is a total amount of dimethylamine added twice), under vacuum conditions, raising a temperature to 85-95° C. and reacting for 1-1.5 hours; adding epoxypropane at a rate of 5-10 mL/min-1 with an amount of 10-30% of a total amount of epoxypropane (in this application, epoxypropane was added twice, and the total amount of epoxypropane here refers to a total amount of epoxypropane added twice); a total amount of epoxypropane is 2-3 times a mass of the sucrose; maintaining the temperature at 90-100° C., vacuum ageing for 2-3 hours, then raising the temperature to 120-130° C. and keeping a pressure constant at 0.25-0.3 MPa; adding the remaining dimethylamine and continue adding the remaining epoxypropane at a rate of 5-10 mL/min-1; continuing the reaction until a pressure inside the reactor becomes negative pressure, stopping the reaction, and continuing aging for 2-3 hours; controlling the temperature at 80-90° C., adding 50-60 g of oxalic acid aqueous solution with a mass concentration of 11%-12%, and adding a mixture of magnesium silicate and aluminum silicate; a mass concentration of the mixture of magnesium silicate and aluminum silicate is 0.1-0.2% of a total amount of sucrose, glycerol, and epoxypropane; a mass concentration of dimethylamine is 1-3% of a total amount of sucrose, glycerol, and epichlorohydrin; then stirring for 20-30 minutes, filtering, vacuum dehydration, and drying at 60-70° C. to obtain polyether polyol;

step B: adding solvent N, N-dimethylacetamide, polyether polyol and polyisocyanate from step A to the reaction tank, a solvent mass concentration is 45%-65%, a molar ratio of polyether polyol and polyisocyanate is 1:1.5-1:2, a reaction temperature is 45-60° C., and reacting in a nitrogen atmosphere for 2-3 hours to obtain a prepolymer solution; when the prepolymer solution was cooled to 10-20° C., a mixed amine solution is added for chain extension reaction and chain termination reaction to form a polyurethane solution; a mass fraction of the mixed amine solution in the polyurethane solution is 5-10%; adding p-toluenesulfonyl semicarbazide with a mass concentration of 0.05-0.08% of polyurethane solution, stirring and mixing evenly, then adding aluminum methylene (2, 4-di-tert-butylphenoxy) phosphate with a mass concentration of 0.1-0.5% of polyurethane solution, mixing and maturing for 20-24 hours, and obtaining the spinning solution after defoaming; by using dry spinning technology, the spinning solution is spun and oiled to produce the biobased polyurethane elastic fibers.

In some embodiments of the present disclosure, a mass ratio of magnesium silicate to aluminum silicate in the mixture of magnesium silicate and aluminum silicate is 1:1.

In some embodiments of the present disclosure, the polyisocyanate is a mixture of one or two of toluene diisocyanate, methylene diphenyl diisocyanate, and hexamethylene diisocyanate.

In some embodiments of the present disclosure, the amine solution is prepared by mixing and dissolving ethylenediamine, propane diamine, and diethylamine in a molar ratio of 1:1:1 in dimethylacetamide.

In some embodiments of the present disclosure, the polyether polyol has a molecular weight of 1500-3000.

After adopting the technical solution of the present disclosure, the degree of dissolution and dispersion of sucrose is one of key points of the present disclosure. The incomplete reaction of sucrose, and the residual amount of monomers directly affect the quality of polyether polyols. The present disclosure uses sucrose and glycerol as starting agents, which facilitates the dispersion and dissolution of sucrose. The addition of glycerol can improve the elasticity of biobased polyurethane fibers. The selection of chemical foaming agents in the preparation process of biobased polyurethane elastic fibers is also one of the key points of the present disclosure. Choosing a foaming agent with a higher decomposition temperature can prevent the decomposition of p-toluenesulfonyl semicarbazide during the maturing process of polyurethane raw material, which can produce bubbles and affect the production process. The present disclosure uses sucrose as raw material to prepare polyether polyols and then synthesizes polyurethane with polyisocyanates. Green, environmentally friendly, and biodegradable polyurethane elastic fibers are developed from the source. Through process control, the technical problem of insufficient or unstable reaction caused by the difference in properties between biobased raw materials and petrifaction-based materials is solved, ensuring that the performance of polyurethane elastic fibers is not reduced or partially improved, and balance the cost and performance advantages.

DESCRIPTION OF EMBODIMENTS

In order to better understand the technical solution of the present disclosure, a more detailed explanation will be provided below in combination with the embodiments.

Example 1

Adding 342 g of sucrose, 92 g of glycerol, and 4.38 g of dimethylamine into a reaction vessel. After replacing air with nitrogen for 5 times, raising a temperature to 85° C. under vacuum conditions and reacting for 1.5 hours. Adding 307 g of epoxypropane dropwise at a rate of 5 mL/min-1, maintaining the temperature at around 95° C., vacuum aging for 3 hours, then raising the temperature to 120° C. and controlling a pressure at 0.25 MPa. Adding 10.22 g of dimethylamine and continuing to slowly add 718 g of epoxypropane at a rate of 5 mL/min-1. Continuing the reaction until a pressure inside the reaction vessel becomes a negative pressure, stopping the reaction, and continue aging for 3 hours. Heating a prepared polyether to 85° C., adding 50 g of oxalic acid aqueous solution with a mass concentration of 11% and a mixture of 1.46 g of magnesium silicate and 1.46 g of aluminum silicate in sequence, stirring for 20 minutes, filtering, then vacuum dehydrating, drying at 60° C., and obtaining the polyether polyol.

Adding 1.2 kg of N, N-dimethylacetamide, 2 kg of polyether polyol with a molecular weight of 2000, and 0.26 kg of toluene diisocyanate to the reaction tank at a temperature of 50° C. After 3 hours of reaction in a nitrogen atmosphere, a prepolymer solution is obtained. When the prepolymer solution was cooled to 20° C., slowly adding 0.35 kg of ethylenediamine solution for chain extension reaction and chain termination reaction; then adding 1.73 g of chemical foaming agent p-toluenesulfonyl semicarbazide, stirring and mixing evenly, adding 3.46 g of nucleating agent aluminum methylene (2, 4-di-tert-butylphenoxy) phosphate, mixing and maturing for 24 hours, and obtaining spinning solution after defoaming; by using dry spinning technology and processes such as spinning and oiling, biobased polyurethane elastic fibers was produced from the spinning solution. A breaking strength of fibers shall be tested in accordance with GB/T14344-2008 "Test Method for Tensile Properties of Long Filaments". The fiber has a specification of 180 denier, with a tensile strength of 28 grams force at 300%, a breaking strength of 202 grams force, and an elongation at break of 526%.

Example 2

Adding 342 g of sucrose, 92 g of glycerol, and 4.38 g of dimethylamine into a reaction vessel. After replacing air with nitrogen for 5 times, raising a temperature to 85° C. under vacuum conditions and reacting for 1.5 hours. Adding 327 g of epoxypropane dropwise at a rate of 5 mL/min-1, maintaining the temperature at around 95° C., vacuum aging for 3 hours, then raising the temperature to 120° C., controlling a pressure at 0.25 MPa, adding 10.22 g of dimethylamine, and continuing to slowly add 748 g of epoxypropane at a rate of 5 mL/min-1, maintaining the temperature constant, continuing the reaction until a pressure inside the reaction vessel becomes a negative pressure, stopping the reaction, and continue aging for 3 hours. Heating a prepared polyether to 85° C., adding 50 g of oxalic acid aqueous solution with a mass concentration of 11%, and a mixture of 1.46 g of magnesium silicate and 1.46 g of aluminum silicate in sequence, stirring for 20 minutes, filtering, then vacuum dehydrating, drying at 60° C., and obtaining polyether polyol.

Adding 1.2 kg of solvent N, N-dimethylacetamide, 2 kg of polyether polyol with a molecular weight of 2000, and 0.26 kg of toluene diisocyanate to the reaction tank, stirring the reaction at 50° C., and reacting for 3 hours in a nitrogen atmosphere to obtain a prepolymer solution. When the prepolymer solution was cooled to 20° C., slowly adding 0.35 kg of ethylenediamine solution for chain extension reaction and chain termination reaction. Then adding 1.73 g of chemical foaming agent p-toluenesulfonyl semicarbazide, stirring and mixing evenly, adding 3.46 g of nucleating agent aluminum methylene (2, 4-di-tert-butylphenoxy) phosphate, mixing and maturing for 24 hours, and obtaining spinning solution after defoaming. By using dry spinning technology and processes such as spinning and oiling, biobased polyurethane elastic fibers were produced from the spinning solution. The fiber has a specification of 180 denier, with a tensile strength of 32 grams force at 300%, a breaking strength of 262 grams force, and an elongation at break of 628%.

Example 3

Adding 342 g of sucrose, 92 g of glycerol, and 4.38 g of dimethylamine into a reaction vessel. After replacing air with nitrogen for 5 times, raising a temperature to 85° C. under vacuum conditions and reacting for 1.5 hours. Adding 307 g of epoxypropane dropwise at a rate of 5 mL/min-1, maintaining the temperature at around 95° C., and vacuum aging for 3 hours under constant pressure. Then raising the temperature to 120° C. and controlling a pressure at 0.25 MPa. Adding 10.22 g of dimethylamine and continuing to slowly add 718 g of epoxypropane at a rate of 5 mL/min-1, maintaining the temperature constant, and continuing the reaction until the pressure inside the reaction vessel becomes a negative pressure. Stopping the reaction and continue aging for 3 hours. Heating a prepared polyether to 85° C., adding 50 g of oxalic acid aqueous solution with a mass concentration of 11% and a mixture of 1.46 g of magnesium silicate and 1.46 g of aluminum silicate in sequence, stirring for 20 minutes, filtering, then vacuum dehydrating, drying at 60° C., and obtaining polyether polyol.

Adding 1.2 kg of N, N-dimethylacetamide solvent, 2 kg of sucrose polyether polyol with a molecular weight of 2000, and 0.35 kg of toluene diisocyanate to the reaction tank at a temperature of 50° C. After 3 hours of reaction in a nitrogen atmosphere, a prepolymer solution is obtained. When the prepolymer solution was cooled to 20° C., slowly adding 0.35 kg of ethylenediamine solution for chain extension reaction and chain termination reaction. Then adding 1.77 g of chemical foaming agent p-toluenesulfonyl semicarbazide, stirring and mixing evenly, adding 3.55 g of nucleating agent aluminum methylene (2, 4-di-tert-butylphenoxy) phosphate, mixing and maturing for 24 hours, and obtaining spinning solution after defoaming. By using dry spinning technology and processes such as spinning and oiling, biobased polyurethane elastic fibers were produced from the spinning solution. The fiber has a specification of 180 denier, with a tensile strength of 31 grams force at 300%, a breaking strength of 282 grams force, and an elongation at break of 645%.

COMPARATIVE EXAMPLES

The comparative example is Example 3 of CN108251912B, entitled "Preparation Method of Comfortable Polyurethane Elastic Fiber", which involves adding barium azodicarboxylate to N, N-dimethylformamide, and high-speed grinding in a ball mill to form a uniform and stable barium azodicarboxylate solution with a concentration of 30%. A decomposition temperature of barium azodicarboxylate is 240° C.-250° C.; mixing polyether polyols with diisocyanate to prepare-NCO terminated polyurethane prepolymers, adding N, N-dimethylformamide that is fully dissolved to obtain a prepolymer solution; extending the chain of prepolymer solution with diamine to obtain polyurethane raw material; adding barium azodicarboxylate solution to the polyurethane raw material, with a mass of barium azodicarboxylate accounting for 0.28% of a solid content of the polyurethane raw material. Stirring and mixing evenly, then adding other conventional additives. After maturing and defoaming, obtaining the spinning raw material; with the help of a dry spinning system, the spinning solution is heated and solidified into bundles in a high-temperature channel, and then wound into comfortable polyurethane elastic fibers. Spinning conditions: airflow: Co-directional airflow/Top Return Airflow/Bottom Return Airflow=0.80/0.60/0.46; temperature (° C.): upper Spinning chimney/middle Spinning chimney/lower Spinning chimney=270/245/200; spinning speed: 950 m/min. The fiber has a specification of 180 denier, with a tensile strength of 22 grams at 300%, a breaking strength of 182 grams, and an elongation at break of 528%.

The dry spinning technology and process in Examples 1, 2, and 3 are the same as those in the comparative examples.

Of course, the protection scope of the present disclosure is not limited to this embodiment, and anyone who makes similar changes to it can be regarded as not departing from the protection scope of the present disclosure.

What is claimed is:

1. A preparation method for biobased polyurethane elastic fibers, comprising the following steps:
   step A: adding sucrose and glycerol in a molar ratio of 1-2:1 into a reaction vessel, and adding dimethylamine with an amount of 30-50% of a total amount of dimethylamine, under vacuum conditions, raising a temperature to 85-95° C. and reacting for 1-1.5 hours; adding epoxypropane at a rate of 5-10 mL/min-1 with an amount of 10-30% of a total amount of epoxypropane; a total amount of the epoxypropane is 2-3 times a mass of the sucrose; maintaining the temperature at 90-100° C., vacuum ageing for 2-3 hours, then raising the temperature to 120-130° C. and keeping a pressure constant at 0.25-0.3 MPa; adding the remaining dimethylamine and continue adding the remaining epoxypropane at a rate of 5-10 mL/min-1; continuing the reaction until a pressure inside the reactor becomes a negative pressure, stopping the reaction, and continuing aging for 2-3 hours; controlling the temperature at 80-90° C., adding 50-60 g of oxalic acid aqueous solution with a mass concentration of 11%-12%, and adding a mixture of magnesium silicate and aluminum silicate; a mass concentration of the mixture of magnesium silicate and aluminum silicate is 0.1-0.2% of a total amount of sucrose, glycerol, and epoxypropane; a mass concentration of dimethylamine is 1-3% of a total amount of sucrose, glycerol, and epichlorohydrin; then stirring for 20-30 minutes, filtering, vacuum dehydration, and drying at 60-70° C. to obtain polyether polyol;

step B: adding solvent N, N-dimethylacetamide, polyether polyol and polyisocyanate from step A to the reaction tank, a solvent mass concentration is 45%-65%, a molar ratio of polyether polyol and polyisocyanate is 1:1.5-1:2, a reaction temperature is 45-60° C., and reacting in a nitrogen atmosphere for 2-3 hours to obtain a prepolymer solution; when the prepolymer solution is cooled to 10-20° C., a mixed amine solution is added for chain extension reaction and chain termination reaction to form a polyurethane solution; a mass fraction of the mixed amine solution in the polyurethane solution is 5-10%; adding p-toluenesulfonyl semicarbazide with a mass concentration of 0.05-0.08% of polyurethane solution, stirring and mixing evenly, then adding aluminum methylene (2, 4-di-tert-butylphenoxy) phosphate with a mass concentration of 0.1-0.5% of polyurethane solution, mixing and maturing for 20-24 hours, and obtaining the spinning solution after defoaming; by using dry spinning technology, the spinning solution is spun and oiled to produce the biobased polyurethane elastic fibers.

2. The preparation method for biobased polyurethane elastic fibers according to claim 1, wherein a mass ratio of magnesium silicate to aluminum silicate in the mixture of magnesium silicate and aluminum silicate is 1:1.

3. The preparation method for biobased polyurethane elastic fibers according to claim 2, wherein the polyisocyanate is a mixture of one or two of toluene diisocyanate, methylene diphenyl diisocyanate, and hexamethylene diisocyanate.

4. The preparation method for biobased polyurethane elastic fibers according to claim 3, wherein the amine solution is prepared by mixing and dissolving ethylenediamine, propane diamine, and diethylamine in a molar ratio of 1:1:1 in dimethylacetamide.

5. The preparation method for biobased polyurethane elastic fibers according to claim 4, wherein the polyether polyol has a molecular weight of 1500-3000.

* * * * *